(12) United States Patent
Marchal

(10) Patent No.: US 11,509,076 B2
(45) Date of Patent: Nov. 22, 2022

(54) QUICK CHANGE BATTERY CLAMP

(71) Applicant: Billy L. Marchal, Lima, OH (US)

(72) Inventor: Billy L. Marchal, Lima, OH (US)

( * ) Notice: Subject to any disclaimer, the term of this patent is extended or adjusted under 35 U.S.C. 154(b) by 0 days.

(21) Appl. No.: 17/462,731

(22) Filed: Aug. 31, 2021

(65) Prior Publication Data
US 2021/0399446 A1 Dec. 23, 2021

Related U.S. Application Data

(63) Continuation of application No. 17/162,141, filed on Jan. 29, 2021, now Pat. No. 11,139,596.

(60) Provisional application No. 62/968,331, filed on Jan. 31, 2020.

(51) Int. Cl.
*H01R 11/24* (2006.01)
*H01R 43/027* (2006.01)
*H01R 11/28* (2006.01)

(52) U.S. Cl.
CPC .......... *H01R 11/24* (2013.01); *H01R 11/282* (2013.01); *H01R 43/027* (2013.01)

(58) Field of Classification Search
CPC ...... H01R 11/24; H01R 11/282; H01R 43/027
See application file for complete search history.

(56) References Cited

U.S. PATENT DOCUMENTS

| | | | | |
|---|---|---|---|---|
| 1,814,156 A * | 7/1931 | Hedges | ................ | H01R 11/282 439/773 |
| 2,445,946 A | 7/1948 | Harper | | |
| 2,706,284 A | 4/1955 | Hoggatt et al. | | |
| 3,004,239 A | 10/1961 | Devino | | |
| 5,599,210 A | 2/1997 | Green | | |
| 5,707,257 A | 1/1998 | Kotajima et al. | | |
| 6,364,719 B1 * | 4/2002 | Chopra | ................ | H01R 11/282 439/759 |
| D485,235 S | 1/2004 | Liang | | |
| 6,773,310 B2 | 8/2004 | Davis | | |
| 6,802,747 B1 * | 10/2004 | Orange | ................ | H01R 11/282 439/772 |
| 7,052,331 B2 | 5/2006 | Maxwell et al. | | |

(Continued)

OTHER PUBLICATIONS

"Positive Battery Cable Repair Kit For Land Rover Discovery Series II" (Cantolina)[online](retrieved from the internet on Apr. 2, 2021 )<URLhttps://www.roverparts.com/electrical/battery/YSB108490K/>, Aug. 31, 2018 (Aug. 31, 2018) entire document, especially, Fig. 1.

(Continued)

*Primary Examiner* — Briggitte R. Hammond
(74) *Attorney, Agent, or Firm* — Jacob M. Ward; Ward Law Office LLC

(57) ABSTRACT

A quick change battery clamp includes a first clamp body, a second clamp body, and a handle assembly. The second clamp body is coupled to the first clamp body. The handle assembly is selectively disposed through each of the first clamp body and the second clamp body. Each of the first clamp body and the second clamp body define an aperture having a substantially polygonal cross-section configured to receive a battery post. Each of the first clamp body and the second clamp body have an internal wall with a plurality of ridges configured to selectively abut the battery post. The first clamp body and the second clamp body are hingedly connected.

13 Claims, 7 Drawing Sheets

(56) References Cited

U.S. PATENT DOCUMENTS 7,303,448 B1 12/2007 Sproesser
2007/0287326 A1 12/2007 Grippe

OTHER PUBLICATIONS

Written Opinion of the International Searching Authority dated May 3, 2021.

* cited by examiner

QUICK CHANGE BATTERY CLAMP

CROSS REFERENCE TO RELATED APPLICATIONS

This application claims the benefit of U.S. application Ser. No. 17/162,141, filed on Jan. 29, 2021, which in turn claims the benefit of U.S. Provisional Application Ser. No. 62/968,331, filed on Jan. 31, 2020. The entire disclosure of the above application is incorporated herein by reference.

FIELD

The disclosure relates generally to battery clamps, and more specifically, to an improved battery terminal clamp that is easily installed or removed.

INTRODUCTION

This section provides background information related to the present disclosure which is not necessarily prior art.

Most automobiles, motorized vehicles, tractors, and inboard boats are started via battery power. The standardized modern battery is the 12-volt battery having metal posts for the opposing polarities of the battery to which connector cables are attached. The standard battery cable connector is a yoke-type structure. The battery cable is connected to one end of the connector and the yoke portion of the connector is fitted over the battery post and clamped down onto the battery post by tightening a nut onto a bolt passing through the two ends of the yoke. Many standard 12-volt batteries will last for several years, especially when used sparingly, as in some recreational boats. During the course of the life of a battery, corrosion buildup may occur and may cause the battery clamp to attach by corrosion to the battery post. Corrosion also tends to build up between the bolt and the nut threaded on the bolt that are used to tighten the yoke about the battery post. Corrosion may impair the proper transmission of battery power from the battery post through the battery cable clamp to the battery cable thereby diminishing the electrical power available.

To remedy the diminished transmission of power, the battery cable clamp has to be removed, corrosion brushed away, and the clamp reamed out so that a solid connection between the clamp and the post can be re-established. This process generally requires loosening of the nut on the bolt clamping the yoke about the post and "breaking" the corrosive seal between the clamp and the post to remove the clamp.

In addition, if the battery is spent, the old battery must be removed and replaced with a new one. In these circumstances, once again, the battery cable clamp must be loosened, and the seal of the corrosion broken to remove the clamp from the post. Because of the corrosion between the bolt and the nut and clamping the yoke to the battery post, either the process of cleaning the battery post and battery cable clamp or replacing the battery can be time consuming and difficult.

There is a continuing need for a battery clamp that is both easily disposed on a battery and easily removed from the battery. Desirably, the battery clamp is ambidextrous, such that, the user may utilize the battery clamp on either the positive pole or the negative pole of the battery.

SUMMARY

In concordance with the instant disclosure, a battery clamp that is both easily disposed on a battery, easily removed from the battery, and is ambidextrously disposable on either a positive pole or a negative pole of the battery has surprisingly been discovered.

A quick change battery clamp that is configured to be reversibly coupled to a battery post is provided which includes a first clamp body, a second clamp body, and a handle assembly. The second clamp body may be coupled to the first clamp body. The handle assembly may be selectively disposed through each of the first clamp body and the second clamp body. Each of the first clamp body and the second clamp body may define an aperture having a substantially polygonal cross-section configured to receive the battery post.

Ways of using the quick change battery clamp are also provided. These may include a method that includes a step of providing a quick change battery clamp having a first clamp body, a second clamp body, and a handle assembly. The second clamp body may be coupled to the first clamp body. The handle assembly may be selectively disposed through each of the first clamp body and the second clamp body. Each of the first clamp body and the second clamp body may define at least one of a substantially square, rectangular, and diamond shaped aperture configured to receive the battery post. The method may have another step of coupling or decoupling the quick change battery clamp with respect to the battery post.

In an exemplary embodiment, each of the first clamp body and the second clamp body may have a top surface, a bottom surface, a side wall, and an interior wall. The first clamp body and the second clamp body may be hingedly connected such that the second clamp body may be moved about a pin between an open position and a closed position.

The interior wall of each of the first clamp body and second clamp body may have a plurality of ridges. Each of the ridges may be substantially parallel to the top surfaces and the bottom surfaces of each of the first clamp body and the second clamp body. Advantageously, the plurality of ridges may militate against the battery clamp from undesirably moving during operation and, therefore, may improve a grip strength of the battery clamp on the battery.

The substantially polygonal cross-section shaped battery post aperture, as defined by the interior wall of each of the first clamp body and the second clamp body, may be further described as a substantially square or diamond shape. The square shape of the battery post aperture in combination with the plurality of ridges may improve the grip strength of the battery clamp. Further, the square battery post aperture may reduce an overall mechanical stress of battery clamp. In other words, the square shape, in combination with the hinge, allow the battery clamp to close while militating against damage to the first clamp body and the second clamp body, where secured to a battery. Advantageously, the square or diamond shape of the battery post aperture may improve the performance and durability of the battery clamp.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
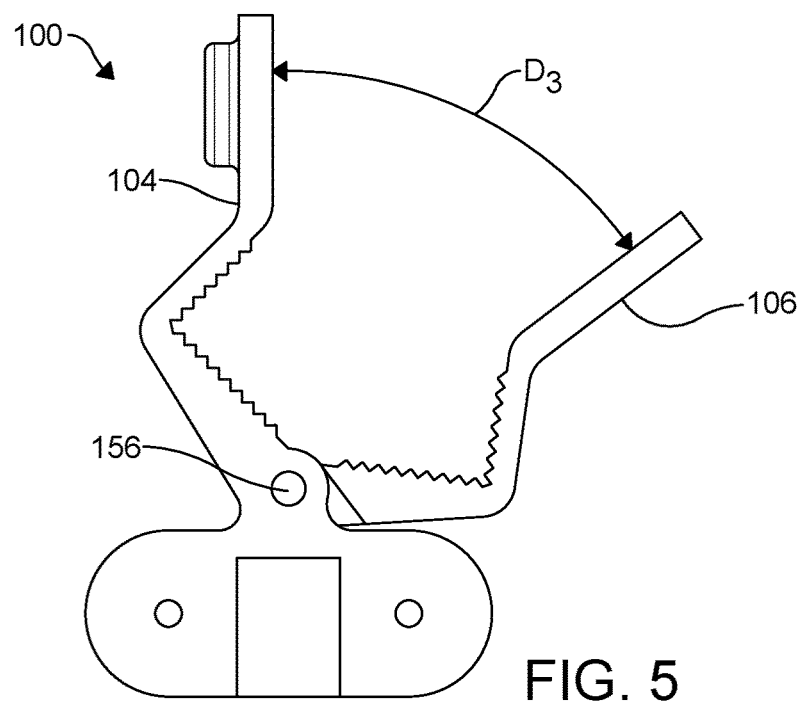
Figure 6:
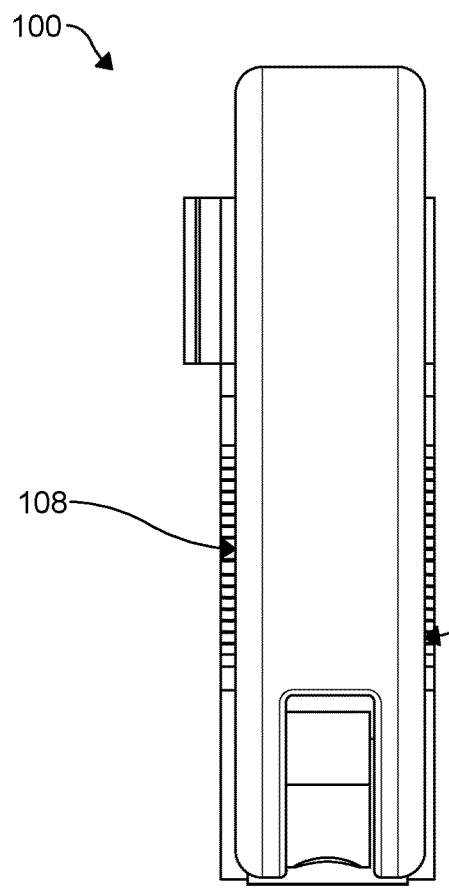
Figure 7:
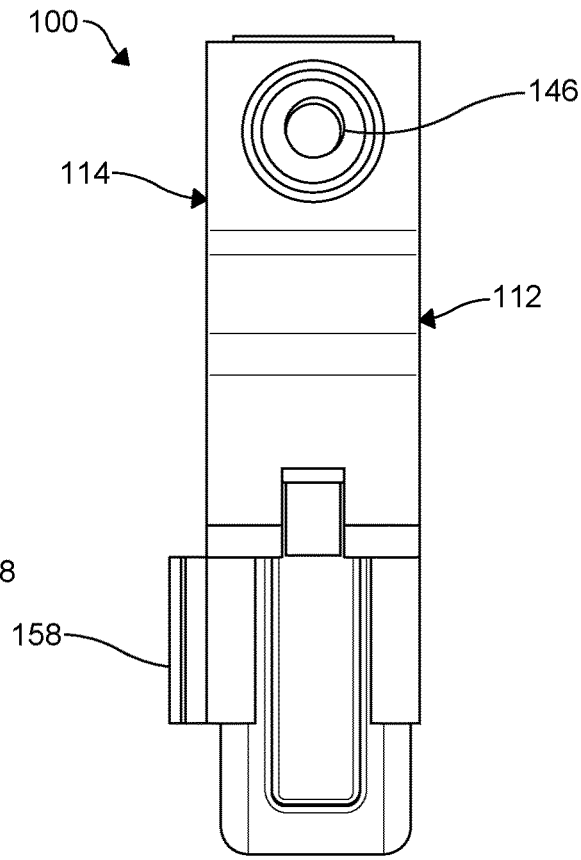
Figure 8:
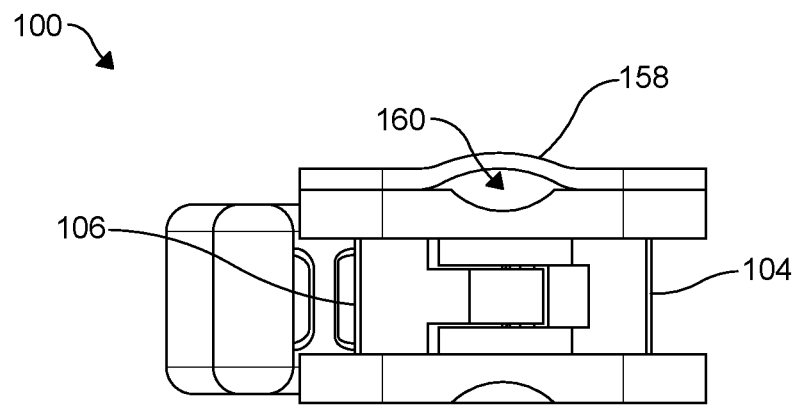
Figure 9:
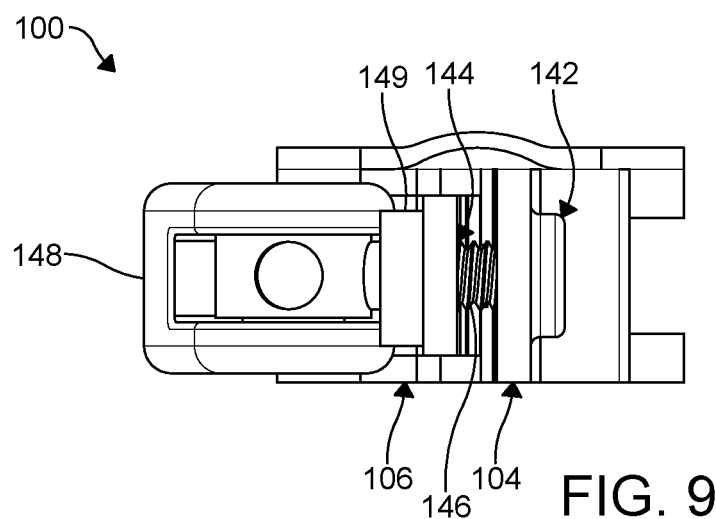
Figure 10:
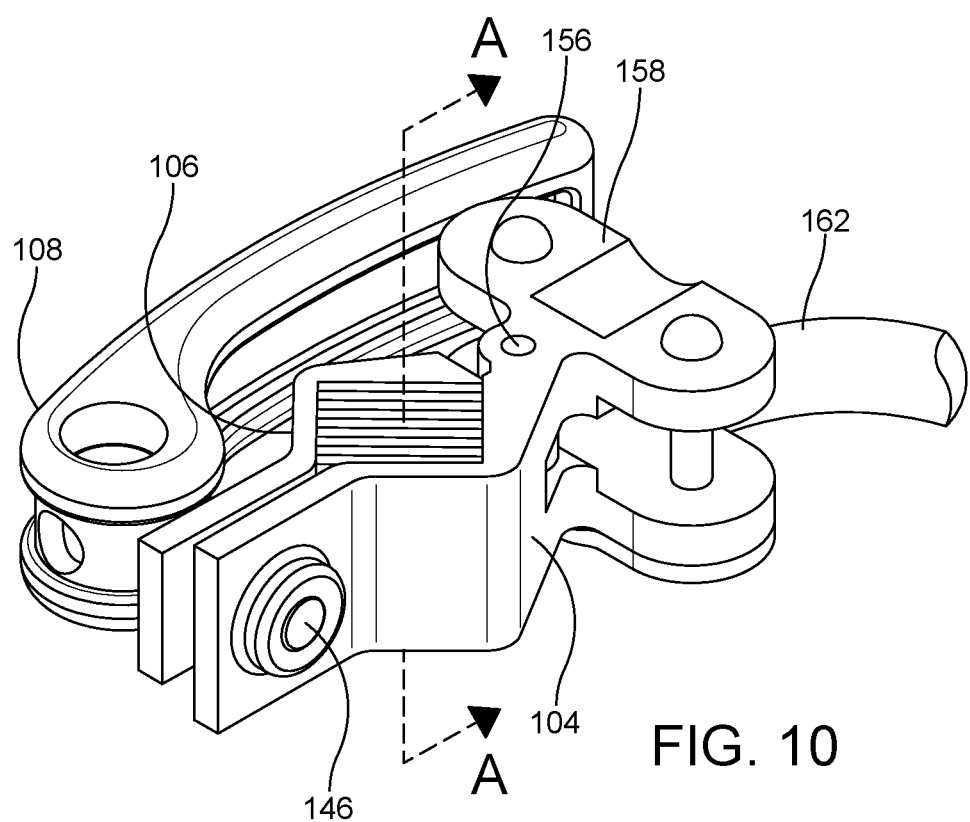
Figure 11:
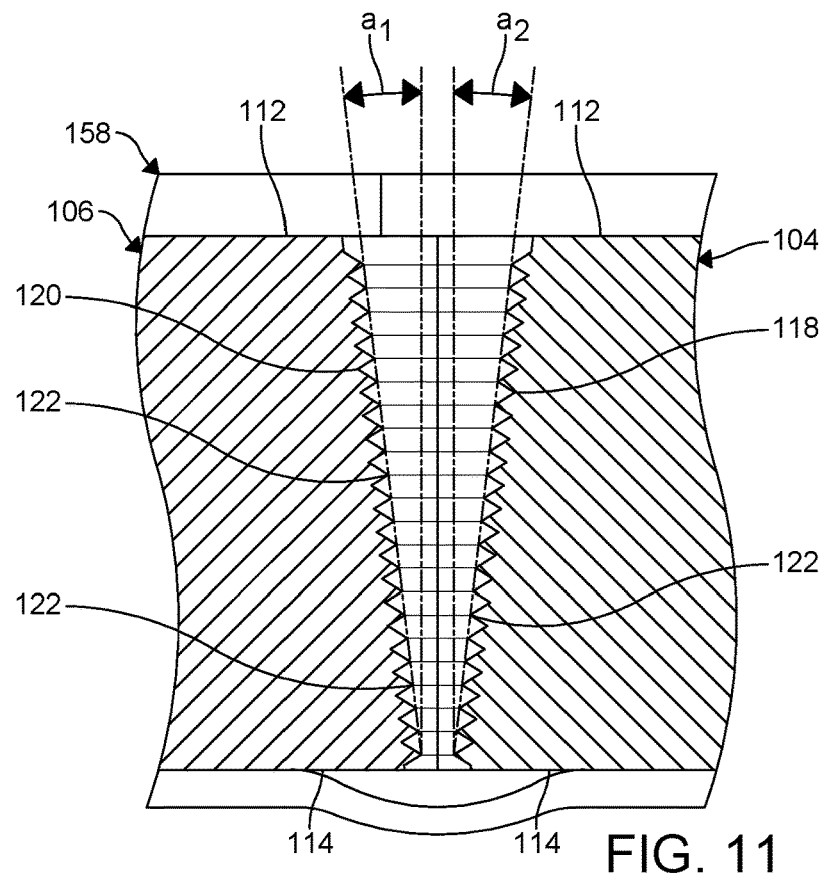
Figure 12:
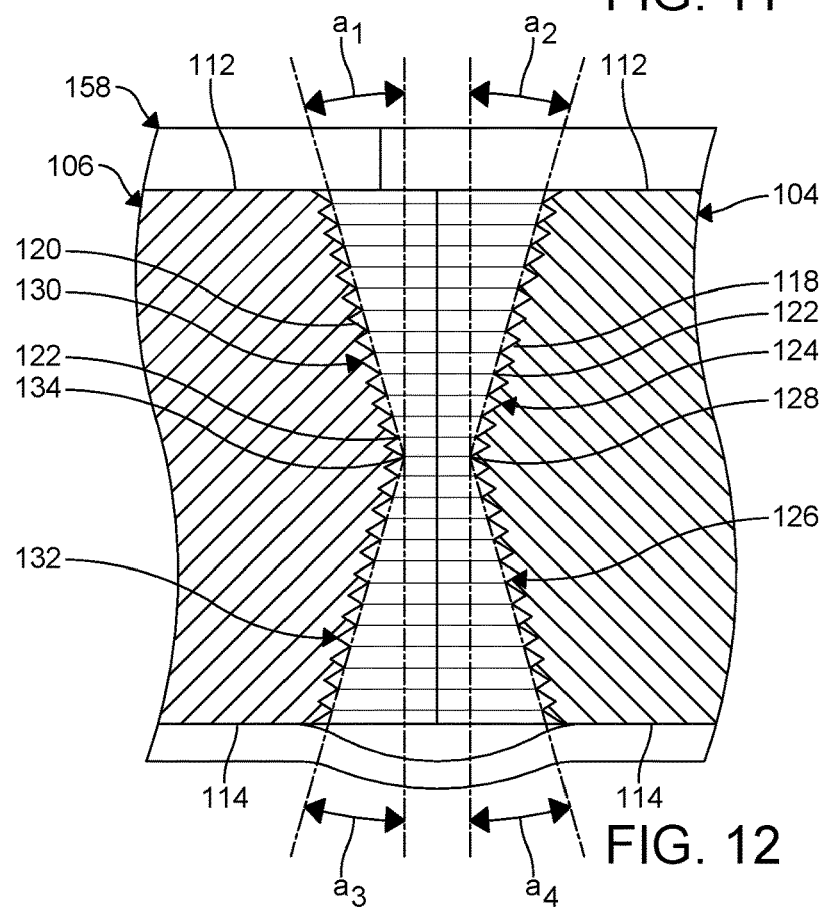
Figure 13:
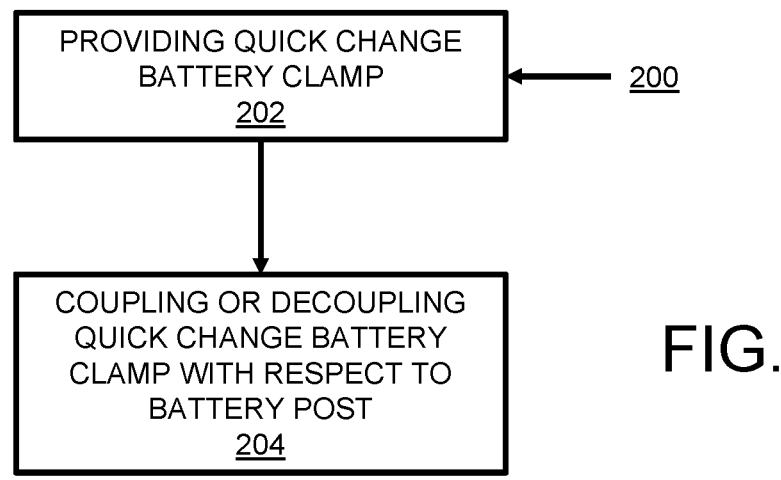

FIG. 5 a bottom plan view of the quick change battery clamp, depicting the hinge connection between the first clamp body and the second clamp body, according to one embodiment of the present disclosure;

FIG. 6 is a left-side elevational view of the quick change battery clamp, as shown in FIGS. 1-4;

FIG. 7 is a right-side elevational view of the quick change battery clamp, as shown in FIGS. 1-4 and 6;

FIG. 8 is a front elevational view of the quick change battery clamp, as shown in FIGS. 1-4 and 6-7;

FIG. 9 is a rear elevational view of the quick change battery clamp, as shown in FIGS. 1-4 and 6-8;

FIG. 10 is a top perspective view of the quick change battery clamp, as shown in FIGS. 1-4 and 6-9, depicted with a wire disposed in the quick change battery clamp, according to one embodiment of the present disclosure;

FIG. 11 is a cross-sectioned front elevational view taken at A-A taken in FIG. 10, depicted with each of a first clamp body and a second clamp body having tapered internal walls, according to one embodiment of the present disclosure;

FIG. 12 is an alternative cross-sectioned front elevational view taken at A-A taken in FIG. 10, depicted with each of the first clamp body and the second clamp body having two tapered internal walls meeting at an apex, according to one embodiment of the present disclosure; and FIG. 13 is a flowchart of a method for using the quick change battery clamp, shown in FIGS. 1-12, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 1-10, a quick change battery clamp 100 that is configured to be reversibly coupled to a battery post 102 is provided which includes a first clamp body 104, a second clamp body 106, and a handle assembly 108. The second clamp body 106 may be coupled to the first clamp body 104. The handle assembly 108 may be selectively disposed through each of the first clamp body 104 and the second clamp body 106. Each of the first clamp body 104 and the second clamp body 106 may define an aperture 110 having a substantially polygonal cross-section configured to receive the battery post 102.

In one example, as shown in FIGS. 2-3, 7, and 11-12, each of the first clamp body 104 and the second clamp body 106 may have a top surface 112, a bottom surface 114, a side wall 116, and an interior wall 118, 120. In a specific example, one of the interior walls 118, 120 may include a plurality ridges 122. In a more specific example, the first clamp body interior wall 118 and the second clamp body interior wall 120 may each have the plurality of ridges 122. Each of the plurality of ridges 122 may be disposed substantially parallel with each of the top surfaces 112 and the bottom surfaces 114 of the first clamp body 104 and the second clamp body 106. Advantageously, the plurality of ridges 122 may militate against the quick change battery clamp 100 from undesirably moving during operation and, therefore, may improve a grip strength of the quick change battery clamp 100 on the battery post 102.

In a particular example, one of the interior walls 118, 120 may be tapered. In a more particular example, as shown in FIGS. 11-12, each of the interior walls 118, 120 of the first clamp body 104 and the second clamp body 106 may be outwardly tapered. The tapered section of the second clamp body 106 is indicated by α1 in FIG. 11. Likewise, the tapered section of the first clamp body 104 is indicated by α2 in FIG. 11. In a particular example, as shown in FIG. 12, the first tapered portion 124 and the second tapered portion 126 of the first clamp body 104 meet at a first apex 128 and the first tapered portion 130 and the second tapered portion 132 of the second clamp body 106 meet at a second apex 134. In a more particular example, the first apex 128 and the second apex 134 may be positioned across from each other. The first apex 128 and the second apex 134 may be further positioned across from each other at intermediate positions on the interior walls 118, 120 from each of the top surfaces 112 and the bottom surfaces 114 of the first clamp body 104 and the second clamp body 106. Alternatively, the first apex 128 and second apex 134 may be positioned across from each other at midpoints on the interior walls 118, 120 with respect to each of the top surfaces 112 and the bottom surfaces 114 of the first clamp body 104 and the second clamp body 106. The angle of the first tapered portion 130 of the second clamp body 106 may be indicated by α1 in FIG. 12. The angle of the first tapered portion 124 of the first clamp body 104 may be indicated by α2 in FIG. 12. The angle of the second tapered portion 132 of the second clamp body 106 may be indicated by α3 in FIG. 12. The angle of the second tapered portion 126 of the first clamp body 104 may be indicated by α4 in FIG. 12. Each of the angles α1, α2, α3, α4 may be different. In a most particular example, each of the first tapered portions 124, 130 and the second tapered portions 126, 132 are outwardly tapered at an angle of about 3.2 degrees. In operation, each of the first apex 128 and the second apex 134 may be in contact with the battery post 102. A skilled artisan may select other suitable angles for the first tapered portions 124, 130 and the second tapered portions 126, 132.

Figure 1:
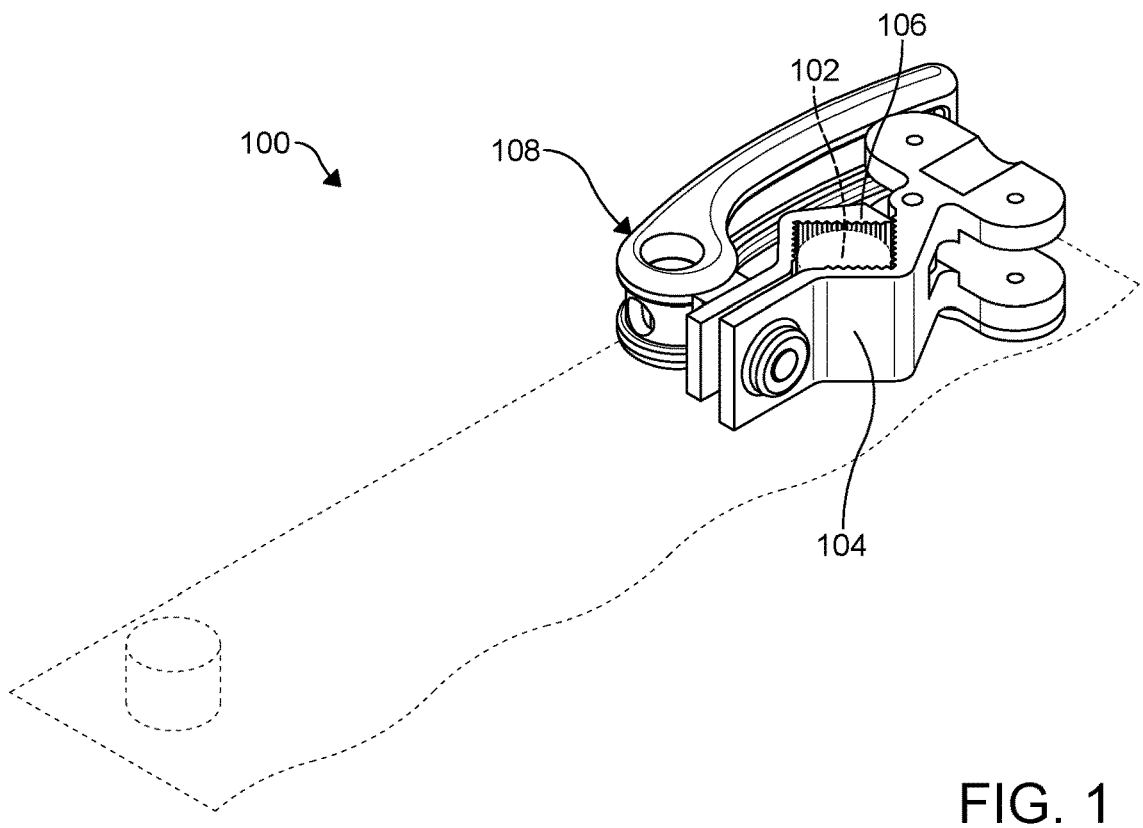
FIG. 1 is a front perspective view of a quick change battery clamp configured to be reversibly coupled to a battery post, according to one embodiment of the present technology.
Figure 2:
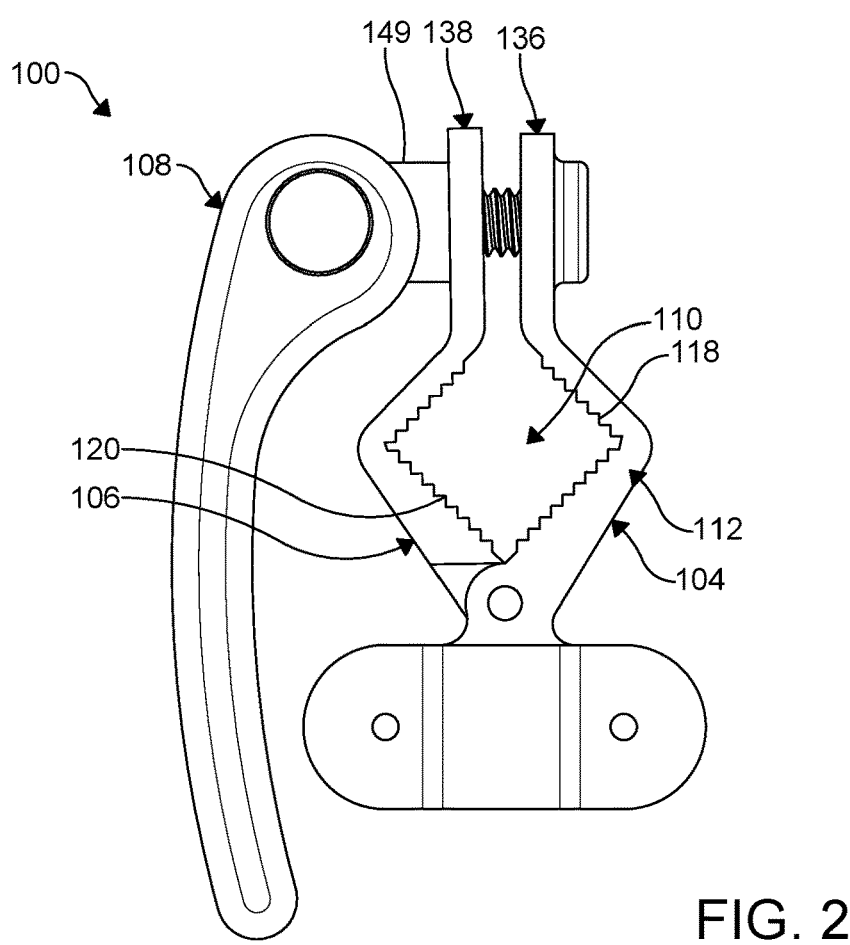
FIG. 2 is a top plan view of the quick change battery clamp, as shown in FIG. 1.
Figure 3:
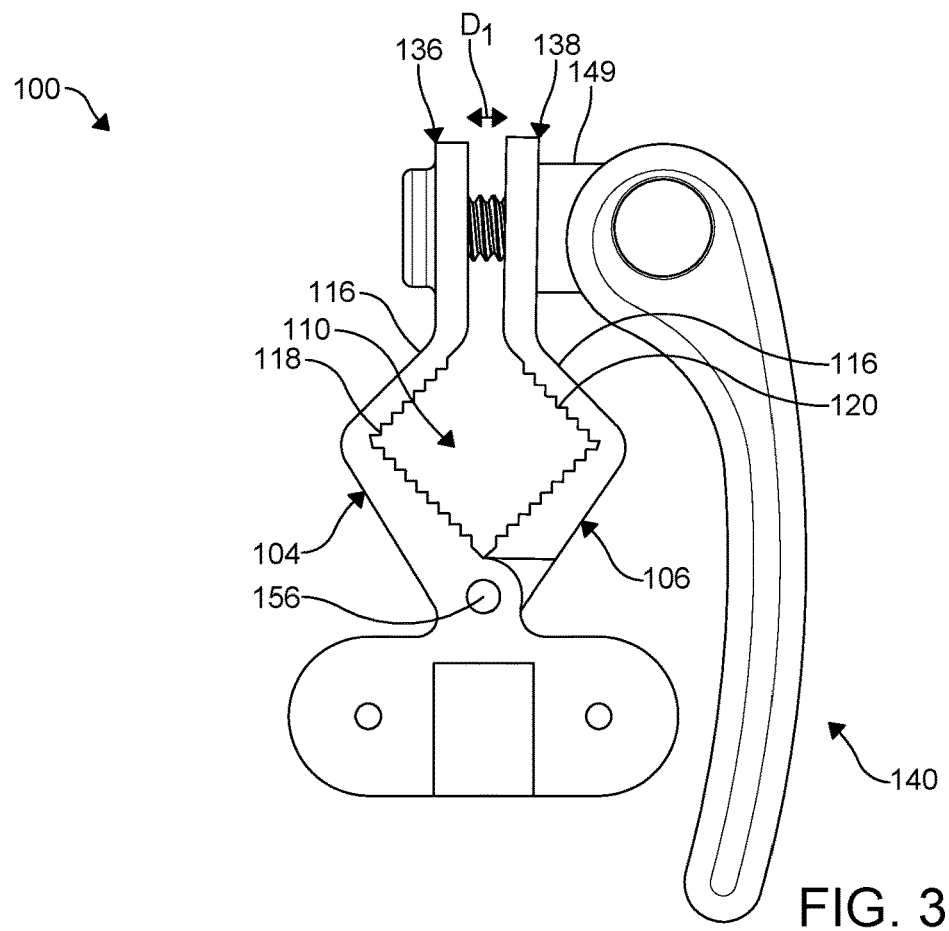
FIG. 3 is a bottom plan view of the quick change battery clamp, as shown in FIGS. 1-2, depicted in a closed position, according to one embodiment of the present disclosure.
Figure 4:
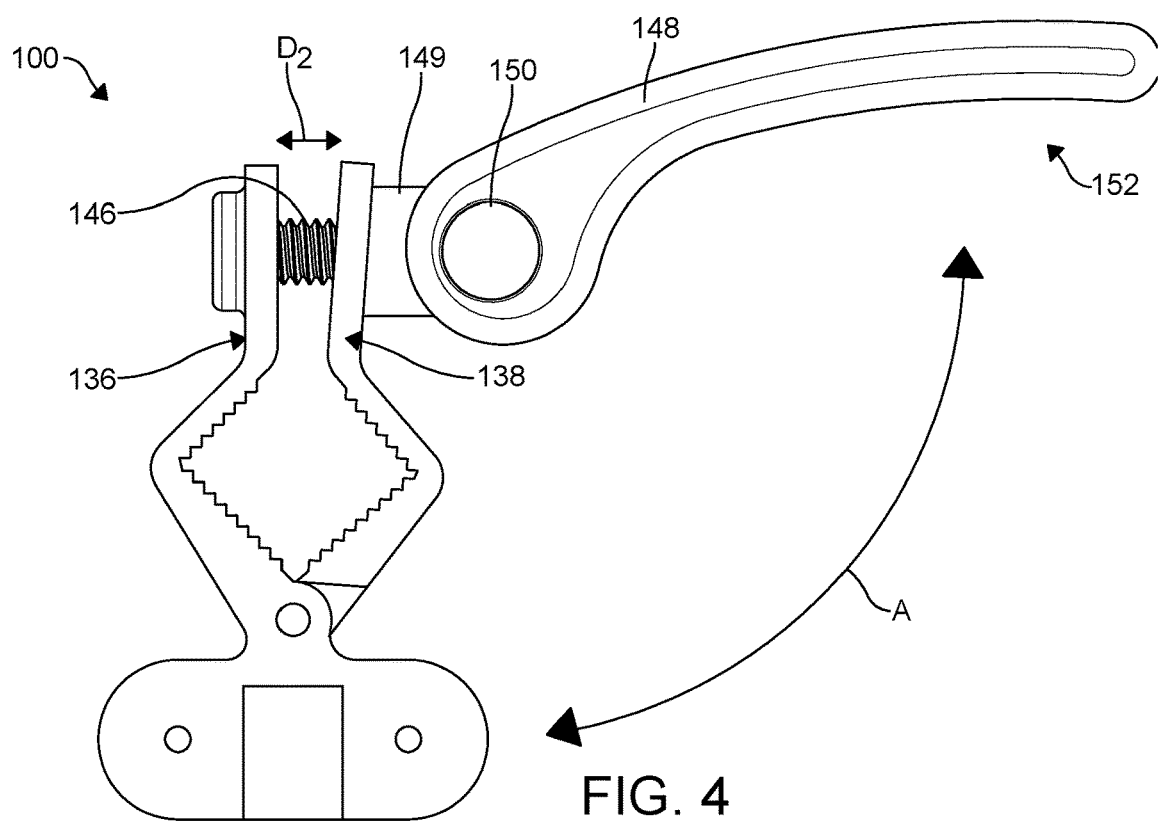
FIG. 4 is a bottom plan view of the quick change battery clamp, as shown in FIGS. 1-3, depicted in an open position, according to one embodiment of the present disclosure.

As shown in FIGS. 2-4, each of the first clamp body 104 and the second clamp body 106 may have a connection portion 136, 138, the first clamp body connection portion 136 and the second clamp body connection portion 138 may be disposed adjacently when the quick change battery clamp 100 is in a closed position 140. The first clamp body 104 may have a fixed connection to the handle assembly 108. Non-limiting examples of the fixed connection may include coupling by gluing, welding, using rivets, and using bolts. In a specific example, the first clamp body connection portion 136 may have a threaded aperture 142 and the second clamp body connection portion 138 may have a non-threaded aperture 144. The handle assembly 108 may be configured to be selectively disposed through each of the threaded aperture 142 and the non-threaded aperture 144. In a more specific example, the handle assembly 108 may be further described as a cam lever. The handle assembly 108 may include a threaded rod 146 and a handle 148. The threaded rod 146 may inserted through the non-threaded aperture 144 and further rotated into the threaded aperture 142. The handle assembly 108 may be configured to rotate the threaded rod 146 into the threaded aperture 142 as a coarse adjustment for engaging the handle assembly. The handle 148 may be rotatably coupled to the threaded rod 146. In an even more specific example, the handle 148 may be coupled to the threaded rod 146 by a cross pin 150. The handle 148 may be engaged 0038 the second clamp body connection portion 138. Alternatively, the handle may be engaged against a spacer 149. As non-limiting examples, the spacer 149 may be flat (not shown) or scalloped to accept the handle 148, as shown in FIGS. 2-4. In another specific example, the distance between a center of the cross pin 150 and the spacer 149 may be greater when the handle in engaged in the closed position, as shown in FIG. 3. The change in distance between the center of the cross pin 150 and the spacer 149 may be configured to provide a fine adjustment for engaging the handle assembly. It should be appreciated that each of the first clamp body connection portion 136 and the second clamp body connection portion 138 may be disposed adjacent to one another when the quick change battery clamp 100 is in the closed position 140, as shown in FIG. 3, further indicated by a first distance D1. Conversely, each of the first clamp body connection portion 136 and the second clamp body connection portion 138 may be disposed farther apart from one another when the quick change battery clamp 100 is in an open position 152, indicated by a second distance D2, as shown in FIG. 4.

In operation, the threaded rod 146 may be first disposed through the non-threaded aperture 144 and then threaded aperture 142. As the threaded rod 146 is disposed through the threaded aperture 142, the handle 148 may abut one of the second clamp body 106 or the spacer 149. The handle 148 may then be rotated and tightened, as indicated by an arc A in FIG. 4, from the open position shown in FIG. 4 to the closed position shown in FIG. 3. The tightening of the handle 148 may be configured to pull the first clamp body connection portion 136 toward the second clamp body connection portion 138, thereby disposing the quick change battery in the closed position 140.

In a specific example, the quick change battery clamp 100 may be ambidextrously disposable on either a positive pole battery post 102 or a negative pole battery post 102. Advantageously, the ambidextrous capability may enhance the cost and time efficiency of using the quick change battery clamp 100. Each of the first clamp body 104 and the second clamp body 106 may be constructed from electrically conductive, rust resistant, and corrosion resistant materials. In a more specific, non-limiting example, each of the first clamp body 104 and the second clamp body 106 may be constructed from stainless steel. Desirably, the electrically conductive, rust resistant, and corrosion resistant materials used to construct the quick change battery clamp 100 may enhance durability and performance. One skilled in the art may select other suitable materials to construct the quick change battery clamp 100, within the scope of the present disclosure.

In a particular example, the substantially polygonal cross-section shaped battery post aperture 110, as defined by the interior walls 118, 120 of each of the first clamp body 104 and the second clamp body 106, may be further described as a substantially quadrilateral cross-section. In a more particular example, the substantially quadrilateral cross-section may be even further described as having a substantially square or diamond shape. The quadrilateral shape of the battery post aperture 110 in combination with the plurality of ridges 122 may improve the grip strength of the quick change battery clamp 100. Further, the quadrilateral battery post aperture 110 may reduce an overall mechanical stress of the quick change battery clamp 100. Advantageously, the quadrilateral shape of the battery post aperture 110 may improve the performance and durability of the quick change battery clamp 100.

As shown in FIGS. 3, 5, and 10, the first clamp body 104 and the second clamp body 106 may be hingedly connected such that the second clamp body 106 may be moved about a pin 156 between the open position 152 and the closed position 140. In a specific example, the pin 156 may be disposed through each of the first clamp body 104 and the second clamp body 106, wherein the second clamp body 106 is configured to selectively rotate about the pin 156 relative to the first clamp body 104, as indicated by D3 in FIG. 5. Advantageously, the quadrilateral shape, in combination with the hinge connection, allows the quick change battery clamp 100 to close while militating against damage to the first clamp body 104 and the second clamp body 106, when secured to the battery post 102.

In a particular example, the first clamp body 104 may have a wire connecting structure 158. The wire connecting structure 158 may be a plate with a raised area disposed on either the top surface 112 or the bottom surface 114 of the first clamp body 104. The wire connecting structure 158 may include a channel 160 configured to receive a wire 162. The wire connecting structure 158 may further include a way of connecting the wire connecting structure 158 to the first clamp body 104. As a non-limiting example, the wire connecting structure 158 may be connected to the first clamp body by a fastener 164, as shown in FIG. 10. The fastener 164 may be inserted from either the top surface 112 or the bottom surface 114 of the first clamp body 104. In an alternative example, the first clamp body 104 may integrally include the wire connecting structure 158 and the wire 162.

In particular embodiments, including the example shown in FIG. 13, a method 200 is provided that has a step 202 of providing a quick change battery clamp 100 having a first clamp body 104, a second clamp body 106, and a handle assembly 108. The second clamp body 106 may be coupled to the first clamp body 104. The handle assembly 108 may be selectively disposed through each of the first clamp body 104 and the second clamp body 106. Each of the first clamp body 104 and the second clamp body 106 may define a polygonal cross-section shaped aperture 110 configured to receive the battery post 102. The method 200 may have another step 202 of coupling or decoupling the quick change battery clamp 100 with respect to the battery post 102.

Advantageously, the quick change battery clamp 100 of the present disclosure is both easily disposed on the battery and easily removed from the battery. The battery clamp may permit ability to change the battery by hand without the need for one or more tools. Further, the battery clamp is ambidextrous, such that, the battery clamp may be utilized on either the positive pole or the negative pole of the battery, as desired.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A quick change battery clamp configured to be reversibly coupled to a battery post, comprising:
   a first clamp body;
   a second clamp body coupled to the first clamp body;
   a pin disposed through each of the first clamp body and the second clamp body, wherein the second clamp body is configured to selectively rotate about the pin relative to the first clamp body; and
   a handle assembly selectively disposed through each of the first clamp body and the second clamp body and configured to transition the first clamp body and the second clamp body between an open position and a closed position,
   wherein the first clamp body and the second clamp body define an aperture having a substantially polygonal cross-section configured to receive the battery post,
   wherein each of the first clamp body and the second clamp body have a connection portion, the first clamp body connection portion and the second clamp body connection portion disposed adjacently when the quick change battery clamp is in a closed position, wherein the first clamp body connection portion is fixedly coupled to a portion of the handle assembly, wherein the handle assembly is a cam lever, wherein the cam lever includes a rod and a handle, the handle biases against the second connection portion, where the rod is disposed through a non-threaded aperture of the second connection portion and is affixed to the first connection portion, wherein an interior wall of one of the first clamp body, the second clamp body, and the first clamp body and the second clamp body is outwardly tapered, wherein the outwardly tapered interior wall of the one of the first clamp body, the second clamp body, and the first clamp body and the second clamp body has a first tapered portion and a second tapered portion, wherein the first tapered portion and the second tapered portion of the one of the first clamp body, the second clamp body, and the first clamp body and the second clamp body meet at an apex, and wherein the first tapered portion and the second tapered portion are disposed at intermediate positions along of each of the first clamp body and the second clamp body.

2. The quick change battery clamp of claim 1, wherein the interior wall of one of the first clamp body, the second clamp body, and the first clamp body and the second clamp body includes a plurality of ridges.

3. The quick change battery clamp of claim 2, wherein the plurality of ridges are disposed substantially parallel with a top surface and a bottom surface of the one of the first clamp body, the second clamp body, and the first clamp body and the second clamp body.

4. A quick change battery clamp configured to be reversibly coupled to a battery post, comprising:

a first clamp body;

a second clamp body coupled to the first clamp body;

a pin disposed through each of the first clamp body and the second clamp body, wherein the second clamp body is configured to selectively rotate about the pin relative to the first clamp body; and a handle assembly selectively disposed through each of the first clamp body and the second clamp body and configured to transition the first clamp body and the second clamp body between an open position and a closed position, wherein the first clamp body and the second clamp body define an aperture having a substantially polygonal cross-section configured to receive the battery post, wherein an interior wall of one of the first clamp body, the second clamp body, and the first clamp body and the second clamp body is outwardly tapered, wherein the outwardly tapered interior wall of the one of the first clamp body, the second clamp body, and the first clamp body and the second clamp body has a first tapered portion and a second tapered portion, wherein the first tapered portion and the second tapered portion of the one of the first clamp body, the second clamp body, and the first clamp body and the second clamp body meet at an apex, wherein the first tapered portion and the second tapered portion are disposed at intermediate positions along of each of the first clamp body and the second clamp body.

5. The quick change battery clamp of claim 4, wherein each of the first tapered portion and the second tapered portion of the one of the first clamp body, the second clamp body, and the first clamp body and the second clamp body is outwardly tapered at an angle of about 3.2 degrees.

6. The quick change battery clamp of claim 4, wherein each of the first tapered portion and the second tapered portion meet at a midpoint along interior walls of the one of the first clamp body, the second clamp body, and the first clamp body and the second clamp body.

7. The quick change battery clamp of claim 1, wherein the rod is rotated into a threaded aperture of the first connection portion.

8. The quick change battery clamp of claim 1, wherein the handle is rotatably connected to the rod.

9. The quick change battery clamp of claim 1, wherein the substantially polygonal cross-section is a substantially quadrilateral cross-section.

10. The quick change battery clamp of claim 1, further comprising a wire connecting structure disposed on one of a top surface and a bottom surface of the first clamp body.

11. The quick change battery clamp of claim 1, wherein the second clamp body is hingedly connected to the first clamp body.

12. A quick change battery clamp configured to be reversibly coupled to a battery having a positive pole battery post and a negative pole battery post, comprising:

a first clamp body;

a second clamp body coupled to the first clamp body; and a handle assembly selectively disposed through each of the first clamp body and the second clamp body and configured to transition the first clamp body and the second clamp body between an open position and a closed position, wherein the first clamp body and the second clamp body define an aperture having a substantially polygonal cross-section configured to receive the battery post, wherein the quick change battery clamp is ambidextrously disposable on either the positive pole battery post or the negative pole battery post, wherein each of the first clamp body and the second clamp body have a connection portion, the first clamp body connection portion and the second clamp body connection portion disposed adjacently when the quick change battery clamp is in a closed position, wherein the first clamp body connection portion is fixedly coupled to a portion of the handle assembly, wherein the handle assembly is a cam lever, wherein the cam lever includes a rod and a handle, the handle biases against the second connection portion, where the rod is disposed through a non-threaded aperture of the second connection portion and is affixed to the first connection portion;

wherein an interior wall of one of the first clamp body, the second clamp body, and the first clamp body and the second clamp body is outwardly tapered, wherein the outwardly tapered interior wall of the one of the first clamp body, the second clamp body, and the first clamp body and the second clamp body has a first tapered portion and a second tapered portion, wherein the first tapered portion and the second tapered portion of the one of the first clamp body, the second clamp body, and the first clamp body and the second clamp body meet at an apex, and wherein the first tapered portion and the second tapered portion are disposed at intermediate positions along of each of the first clamp body and the second clamp body.

13. A method of using a quick change battery clamp with a battery post, the method comprising the steps of:

providing the quick change battery clamp having a first clamp body, a second clamp body coupled to the first clamp body, a pin disposed through each of the first clamp body and the second clamp body, wherein the second clamp body is configured to selectively rotate about the pin relative to the first clamp body, and a handle assembly selectively disposed through each of the first clamp body and the second clamp body and configured to transition the first clamp body and the second clamp body between an open position and a closed position, wherein the first clamp body and the second clamp body define a polygonal cross-section aperture configured to receive the battery post, wherein each of the first clamp body and the second clamp body have a connection portion, the first clamp body connection portion and the second clamp body connection portion disposed adjacently when the quick change battery clamp is in a closed position, wherein the first clamp body connection portion is fixedly coupled to a portion of the handle assembly, wherein the handle assembly is a cam lever, and wherein the cam lever includes a rod and a handle, the handle biases against the second connection portion, where the rod is disposed through the aperture of the second connection portion and is affixed to the first connection portion, and further wherein an interior wall of one of the first clamp body, the second clamp body, and the first clamp body and the second clamp body is outwardly tapered, wherein the outwardly tapered interior wall of the one of the first clamp body, the second clamp body, and the first clamp body and the second clamp body has a first tapered portion and a second tapered portion, wherein the first tapered portion and the second tapered portion of the one of the first clamp body, the second clamp body, and the first clamp body and the second clamp body meet at an apex, wherein the first tapered portion and the second tapered portion are disposed at intermediate positions along of each of the first clamp body and the second clamp body; and coupling or decoupling the quick change battery clamp with respect to the battery post.

\* \* \* \* \*